(12) United States Patent
Deng et al.

(10) Patent No.: US 8,416,456 B2
(45) Date of Patent: Apr. 9, 2013

(54) SCANNING APPARATUS ACHIEVING BOUNDARY LOCALIZATION AND METHOD FOR ACHIEVING BOUNDARY LOCALIZATION THEREOF

(75) Inventors: Rongfang Deng, Shenzhen (CN); Weijun Gan, Shenzhen (CN); Debin Zhang, Shenzhen (CN)

(73) Assignee: Sky Light Electronic (Shenzhen) Limited, Shenzhen (CN)

( * ) Notice: Subject to any disclaimer, the term of this patent is extended or adjusted under 35 U.S.C. 154(b) by 305 days.

(21) Appl. No.: 12/916,620

(22) Filed: Oct. 31, 2010

(65) Prior Publication Data

US 2011/0157665 A1 Jun. 30, 2011

(30) Foreign Application Priority Data

Dec. 30, 2009 (CN) .......................... 2009 1 0238868

(51) Int. Cl.
*G06F 15/00* (2006.01)
(52) U.S. Cl.
USPC ............................ 358/1.9; 347/224; 347/244

(58) Field of Classification Search ........................ None
See application file for complete search history.

(56) References Cited

U.S. PATENT DOCUMENTS

2007/0019251 A1* 1/2007 Liao .............................. 358/474

* cited by examiner

*Primary Examiner* — Twyler Haskins
*Assistant Examiner* — Helen Q Zong

(57) ABSTRACT

The present invention relates to a method for achieving boundary localization in a scanning apparatus, as well as to a scanning apparatus, which is capable of achieving intelligent judgement on boundary localization of the scanned file by means of this method, through an effective combination of optical, electronical and mechanical techniques. Said method comprises: a regular ribbon, a sensor module capable of detecting the ribbon, and the file to be scanned is placed between the ribbon and the sensor module; said sensor module first scans the ribbon information and stores it in the storage module of the scanning apparatus; said file to be scanned is placed between the sensor module and the ribbon, through the measured ribbon portion covered by the file to be scanned, the sensor is capable of deriving the boundary position of the file to be scanned by means of contrast measurement. With the scanning apparatus capable of achieving boundary localization.

10 Claims, 4 Drawing Sheets

SCANNING APPARATUS ACHIEVING BOUNDARY LOCALIZATION AND METHOD FOR ACHIEVING BOUNDARY LOCALIZATION THEREOF

BACKGROUND OF THE INVENTION

The present invention relates to a method for achieving boundary localization in a scanning apparatus, as well as to a scanning apparatus, which is capable of achieving intelligent judgement on boundary localization of the scanned file by means of this method, through an effective combination of optical, electronical and mechanical techniques.

This application claims priority from China Patent Application No. 200910238868.4, filed on 30 Dec. 2009, the contents of which are hereby incorporated by reference in their entirety for all purposes.

With the scanning apparatus of conventional art, upon scanning an item of an undefined format, unwanted marginal corners often appear although files or pictures to be scanned is enabled to be scanned and stored. Thus, the scanned files obtained usually need to be re-processed by other softwares.

The scanning apparatus is generally classified into two types, the first is the paper feeding type, the other is the backboard type. The backboard type generally means that the entire plane surface that can be sensed by the whole of the sensor module of the scanning apparatus is scanned, or the file is scanned while being placed at the position of a defined specification, and the processing method for the item to be scanned having a special specification or shape is utterly absent. Then, as to the paper feeding type scanning apparatus, an activation lever is generally provided at the file inlet, thus the width of the file may be determined; then whether or not the scanning of the file is completed is judged via the passing switch provided at the paper inlet. Thus the operation has to be carried out manually, and as to the item to be scanned having a special shape, the boundary localization is still unsatisfying.

BRIEF SUMMARY OF THE INVENTION

One of the purposes of the present invention, a scanning apparatus capable of achieving boundary localization, is to solve the problems in the conventional art.

The present invention may be realized with the following technical solution:

A method for achieving boundary localization during scanning, said method comprises: a regular ribbon, a sensor module capable of detecting the ribbon, and the file to be scanned is placed between the ribbon and the sensor module; said sensor module first scans the ribbon information and stores it in the storage module of the scanning apparatus; said file to be scanned is placed between the sensor module and the ribbon, the sensor is capable of deriving the boundary position of the file to be scanned by means of contrast measurement through the measured ribbon portion covered by the file to be scanned.

Wherein, the ribbon is composed by regular color codes. The color code may consist of graphs, patterns or color blocks successively arranged that have color differences.

A paper feeding type scanning apparatus capable of achieving the method of boundary localization during scanning, said scanning apparatus comprises: a scanning apparatus processor and a scanning apparatus scanning terminal, the scanning terminal is provided with a CIS module, and is further provided with a ribbon that is correspondingly placed between the CIS module and the file to be scanned; said ribbon is a strip-like ribbon with alternating colors and is provided at the paper inlet of the scanning terminal of the scanner; the ribbon is composed by transversely connecting color grids having a common width, and the paper to be scanned is provided between the ribbon and the CIS module; said CIS module is connected with the storage elements of the memory of the scanning apparatus. The ribbon is composed by the color grids with at least two different colors arranging in the length direction of the strip of the ribbon.

Wherein, a preferable ribbon is a ribbon with three alternating colors, that is, the red, green and blue colors.

A backboard type scanning apparatus capable of achieving the method of boundary localization during scanning, the scanning terminal of said scanning apparatus comprises a scanning plane provided with a sensor module and an upper cover opposite to the scanning plane for fixing the item to be scanned, said upper cover is provided on the surface opposite to the sensor module with a ribbon; said ribbon is covering on the whole of the upper cover; the color codes on the ribbon is composed by color blocks with different colors or patterns regularly arranged; said sensor module is connected with the storage elements of the memory of the scanning apparatus.

Wherein, a preferable ribbon may be a ribbon with three alternating colors, that is, the red, green and blue colors, or the ribbon is a ribbon that is composed by squares, triangles and circles that are regularly arranged.

With the scanning apparatus capable of achieving boundary localization provided by the present invention, while it is ensured that the operation is convenient, and the structure is simple, it is enabled to achieve a precise boundary localization on the item to be scanned, thus the post-processing of the scanned file by the user is facilitated.

DETAILED DESCRIPTION OF THE INVENTION

Figure 8:
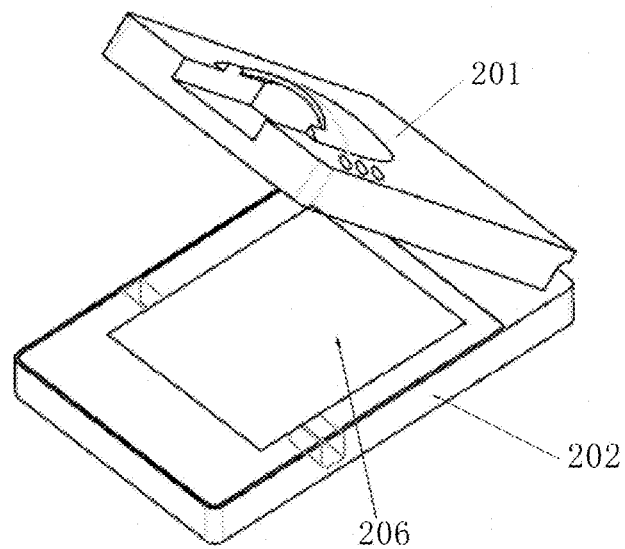
FIG. 8 is an operational illustrating view of the backboard type scanner.

Hereinafter, the present invention is further explained referring to FIG. 1 and FIG. 8, so as to facilitate a better understanding of the concept of the present invention and the implementation thereof for those with ordinary skills in the art.

Figure 1:
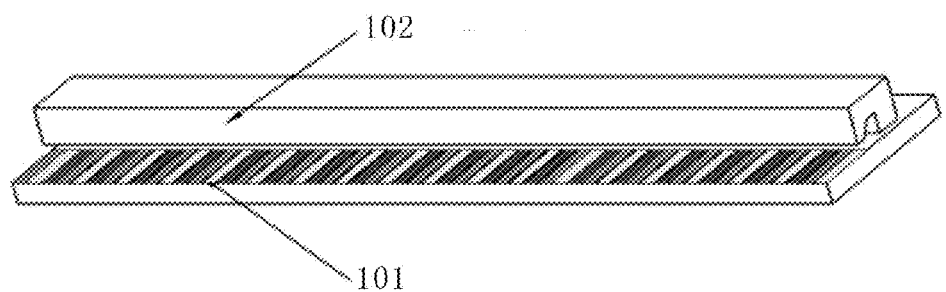
FIG. 1 is a structural illustrating view of the scanning terminal of the scanning apparatus according to the present invention.

As shown in FIG. 1, a scanning apparatus capable of achieving file boundary localization is provided, the scanning terminal thereof comprises a CIS module 102 and a paper inlet, the paper inlet is provided with a ribbon 101 on the surface opposite to the CIS module 102, the CIS module 102 is connected with the storage member and the processing member within the scanning apparatus. The ribbon 101 is a strip-like ribbon 101 with alternating colors, and is composed by different colors that are arranged side by side in the length direction of the strip of the ribbon. Upon the completion of scanning by the scanning apparatus, the CIS module 102 scans the lengths and widths of the corresponding ribbon and of each color grid on the ribbon into the memory of the scanning apparatus as the contrasting information. The ribbon preferably adopts a ribbon with three alternating colors, that is, the red, green and blue colors.

Figure 2:
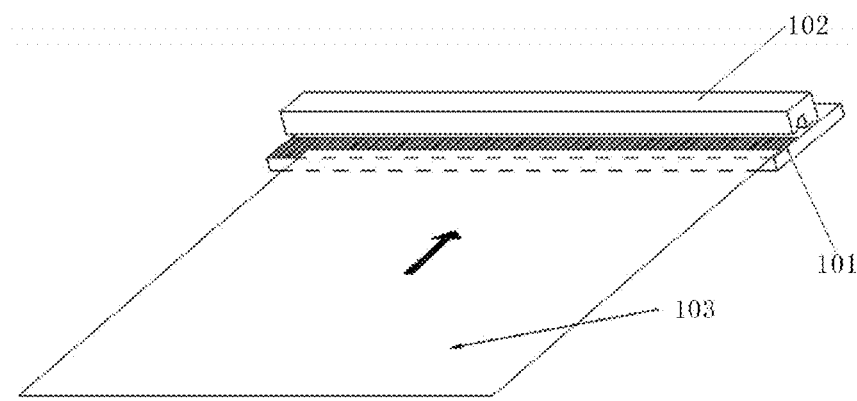
FIG. 2 is a first scanning process illustrating view of the scanning apparatus according to the present invention.
Figure 3:
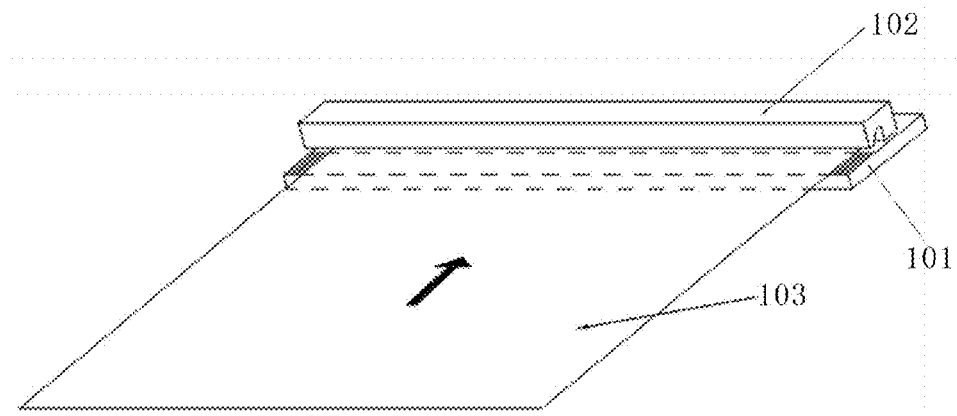
FIG. 3 is a second scanning process illustrating view of the scanning apparatus according to the present invention.
Figure 4:
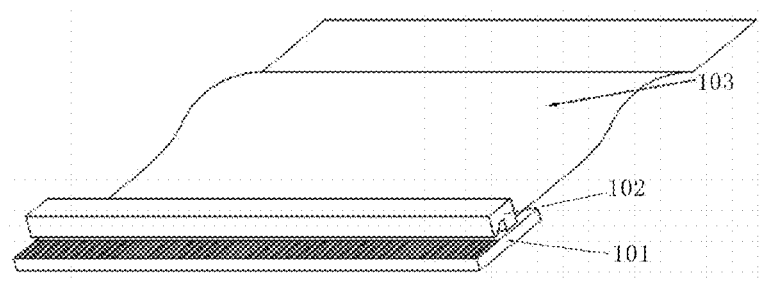
FIG. 4 is a third scanning process illustrating view of the scanning apparatus according to the present invention.
Figure 5:
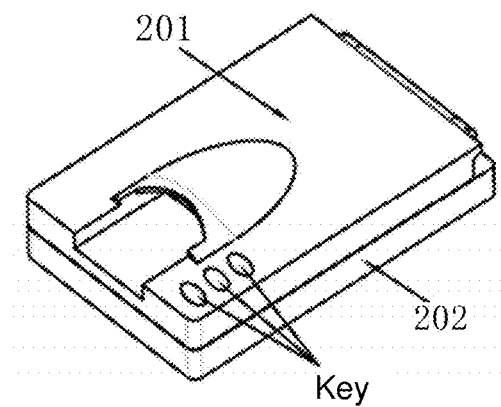
FIG. 5 shows a backboard type scanner.
Figure 6:
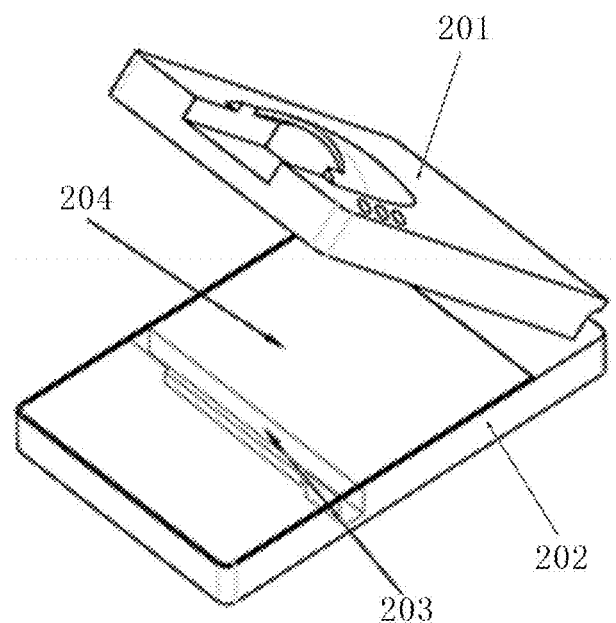
FIG. 6 shows a backboard type scanner.

Referring to what is shown in FIG. 2, FIG. 3 and FIG. 4, upon implementing the method of the file boundary localization during scanning by using the above described scanning apparatus, the paper 103 to be scanned is placed into the scanning terminal of the scanning apparatus firstly. When the paper 103 is placed into the scanning terminal, it is certain that the ribbon 101 of the paper inlet may be covered which is detected by the CIS module 102, then the CIS module 102 transmits the information thus detected into the processing member of the scanning apparatus and after that picks up the original contrasting information of the ribbon 101 stored in the memory so as to make an comparison therebetween, thus the width and the starting end of the paper 103 may be determined.

Upon completion of the scanning, the paper 103 passes automatically, thus the ribbon 101 is re-exposed to be under the CIS module 102 of the scanning terminal. At this time, by the same principle as above, the scanning apparatus will immediately interrupt the scanning of the file, thus the realization of the file boundary localization is attained.

With reference to FIG. 5, FIG. 6, FIG. 7 and FIG. 8, a backboard type scanning apparatus capable of achieving the method of boundary localization during scanning is shown, and the scanning terminal of said scanning apparatus comprises a scanning plane provided with a sensor module and an upper cover 201 opposite to the scanning plane for fixing the item to be scanned, said upper cover 201 is provided on the surface opposite to the sensor module with a ribbon 205; said ribbon 205 is covering on the whole of the upper cover 201; the color codes on the ribbon 205 is composed by color blocks with different colors or patterns regularly arranged; said sensor module is mounted within the lower cover 202 of the scanner and is connected with the storage elements of the memory of the scanning apparatus. Between the ribbon 205 and the sensor module, there is further provided with a glass plate 204, the file 206 to be scanned is placed on the glass plate 204, and the sensor module is a CIS module 203.

During actual operation, that is, upon shipment or calibration, the ribbon 205 on the backboard may be fully scanned by the scanner, and the content thus obtained will be stored in the storage of the scanner perfectly.

Figure 7:
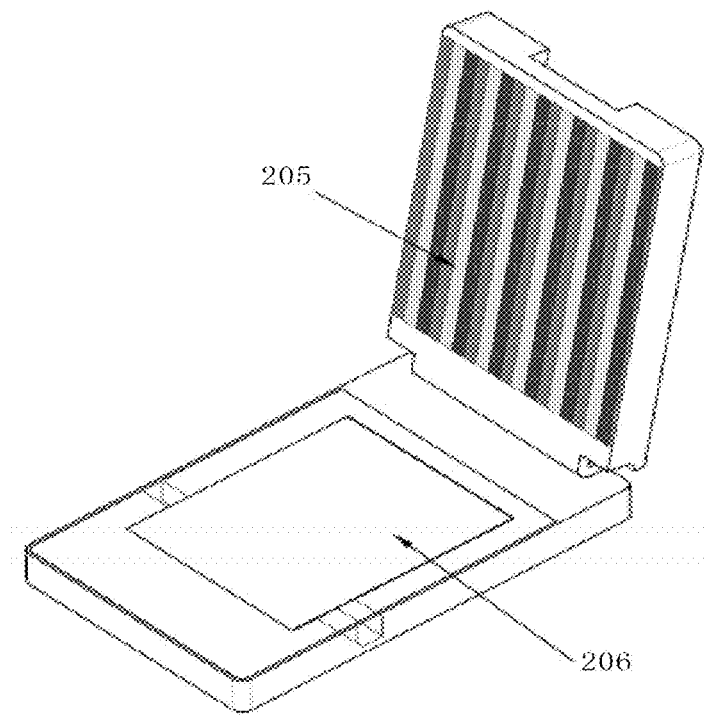
FIG. 7 is an operational illustrating view of the backboard type scanner.

When the scanner is to be used for scanning a file, the upper cover 201 needs to be opened first, then the file 206 is placed on the glass plate 204, and the upper cover 201 is closed. At this time, since the file is located between the CIS module 203 and the upper cover 201, the ribbon 205 may be covered by the file 206, and the CIS module 203 is incapable of scanning the content of the portion of the ribbon 205 that is being covered. As shown in FIG. 7, the file 206 is placed on the glass plate 204, then the upper cover 201 is closed, and the CIS module 203 of the scanner will perform scanning on the file 206 that is placed on the glass plate 204, and compares the content scanned with the content previously stored. Through comparison, in case it is found that the content scanned is inconsistent with the content previously stored, the scanner may consider that the scanning has reached the boundary of the file 206, and may subsequently re-scan the content scanned as the content of the file 206 being scanned, and may consider that the other boundary is reached until the content scanned is consistent with the content previously stored, thus a complete round of scanning is finished. Through this method by comparison, the four boundaries of the file may be detected completely and definitely, thus a perfect scanned file may be obtained finally.

The above is a detailed introduction of the scanner and the particular operational manner thereof provided by the present invention. The specific structure and the implementation method thereof of the present invention is set forth with particular examples in the present context and the above embodiments are merely intended to help understand the core idea of the present invention. Meanwhile, as to those with ordinary skills in the art, according to the idea of the present invention, modifications may be made to the specific manner of implementation and the scope of application. To sum up, the content of the present description is not to be considered as limiting the present invention thereto.

The invention claimed is:

1. A method for achieving boundary localization during scanning, wherein, said method comprises: a regular ribbon, a sensor module capable of detecting the ribbon, and a sheet of paper to be scanned is placed between the ribbon and the sensor module;
   said sensor module first scans ribbon information and stores it in a storage module of a scanning apparatus;
   said sheet of paper to be scanned is placed between the sensor module and the ribbon, the sensor is capable of deriving a boundary position of the sheet of paper to be scanned by means of contrast measurement through the measured ribbon portion covered by the sheet of paper to be scanned.

2. The method for achieving boundary localization during scanning according to claim 1, wherein, the ribbon is composed by regular color codes.

3. The method for achieving boundary localization during scanning according to claim 2, wherein, the color code is composed by regularly arranged graphs.

4. The method for achieving boundary localization during scanning according to claim 3, wherein, the color code is composed by regularly arranged color blocks.

5. A paper feeding type scanning apparatus capable of achieving the method of boundary localization during scanning according to claim 1, wherein, said scanning apparatus comprises: a scanning apparatus processor and a scanning apparatus scanning terminal, the scanning terminal is provided with a CIS module, and is further provided with a ribbon that is correspondingly placed under the CIS module; said ribbon is a strip-like ribbon with alternating colors and is provided at a paper inlet of the scanning terminal of the scanner; the ribbon is composed by transversely connecting color grids which have the same size, and the sheet of paper to be scanned is provided between the ribbon and the CIS module; said CIS module is connected with storage elements of memory of the scanning apparatus.

6. The paper feeding type scanning apparatus capable of achieving the method of boundary localization during scanning according to claim 5, wherein, said ribbon is composed by arranging the color grids with at least two different colors in the length direction of the strip of the ribbon.

7. The paper feeding type scanning apparatus capable of achieving the method of boundary localization during scanning according to claim 6, wherein, said ribbon is a ribbon with three alternating colors, that is, the red, green and blue colors.

8. A backboard type scanning apparatus capable of achieving the method of boundary localization during scanning by the method according to claim 1, wherein, the scanning terminal of said scanning apparatus comprises a scanning plane provided with a sensor module and an upper cover opposite to the scanning plane for fixing the sheet of paper to be scanned, said upper cover is provided on the surface opposite to the sensor module with a ribbon; said ribbon is covering on the whole of the upper cover; color codes on the ribbon is composed by color blocks with different colors or patterns regularly arranged; said sensor module is connected with storage elements of memory of the scanning apparatus.

9. The backboard type scanning apparatus capable of achieving the method of boundary localization during scanning according to claim 8, wherein, said ribbon is a ribbon with three alternating colors, that is, the red, green and blue colors.

10. The backboard type scanning apparatus capable of achieving the method of boundary localization during scanning according to claim 8, wherein, said ribbon is a ribbon that is composed by squares, triangles and circles that are regularly arranged.

* * * * *